US012321389B1

(12) United States Patent
Tanase et al.

(10) Patent No.: US 12,321,389 B1
(45) Date of Patent: Jun. 3, 2025

(54) DYNAMIC BOUNDED MEMORY ALLOCATION

(71) Applicant: Amazon Technologies, Inc., Seattle, WA (US)

(72) Inventors: Ilie Gabriel Tanase, Round Rock, TX (US); Serkan Turgut, Seattle, WA (US); Michael Schmidt, Seattle, WA (US); Bryan Thompson, Seattle, WA (US); Geo T Varkey, Snoqualmie, WA (US); Tiago Lima Salmito, Seattle, WA (US); Herman Yusef Polloni Giacaman, Bothell, WA (US); Yigit Kiran, Seattle, WA (US); Divyakala Vel, Redmond, WA (US); Navtanay Sinha, Seattle, WA (US); Bradley Bebee, Seattle, WA (US); Sainath Chowdary Mallidi, Seattle, WA (US); Ankesh Khandelwal, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 574 days.

(21) Appl. No.: 17/548,348

(22) Filed: Dec. 10, 2021

(51) Int. Cl.
*G06F 16/901* (2019.01)
*G06F 9/50* (2006.01)
*G06F 9/455* (2018.01)

(52) U.S. Cl.
CPC ........ *G06F 16/9024* (2019.01); *G06F 9/5027* (2013.01); *G06F 2009/45583* (2013.01); *G06F 9/5044* (2013.01); *G06F 9/505* (2013.01)

(58) Field of Classification Search
CPC .. G06F 16/9024; G06F 9/5027; G06F 9/5044; G06F 9/505; G06F 2009/45583
See application file for complete search history.

(56) References Cited

U.S. PATENT DOCUMENTS

| 6,505,275 B1* | 1/2003 | Weissman | G06F 9/5016 |
| | | | 711/170 |
| 8,127,295 B1* | 2/2012 | Jones | G06F 9/5011 |
| | | | 718/104 |

(Continued)

FOREIGN PATENT DOCUMENTS

| CN | 109636139 A | 4/2019 |
| CN | 110377715 A | 10/2019 |

(Continued)

OTHER PUBLICATIONS

Dayarathna et a. ("Towards Scalable Distributed Graph Database Engine for Hybrid Clouds", 5th International Workshop on Data Intensive Computing in the Clouds) (Year: 2014).*

(Continued)

*Primary Examiner* — Wissam Rashid
(74) *Attorney, Agent, or Firm* — Davis Wright Tremaine LLP

(57) ABSTRACT

Systems and methods are described for dynamically allocating memory for responding to requests. In some aspects, a thread may be obtained, where the thread includes a request to use a portion of system memory to perform a query of a database, such as a graph database. The system may determine that the portion of memory is greater than available memory of a maximum managed memory size of the system, and may block the thread until additional memory becomes available. The maximum managed memory size may be configurable, and may be less than a total memory of the system. The system may then determine, based at least in part on a change in the available system memory, that the available system memory is equal to or greater than the portion of memory to satisfy the request, and cause the system to process the thread to provide a response to the query.

18 Claims, 8 Drawing Sheets

(56) References Cited

U.S. PATENT DOCUMENTS

| | | |
|---|---|---|
| 10,157,226 B1 | 12/2018 | Costabello et al. |
| 2002/0120601 A1 | 8/2002 | Elmendorf et al. |
| 2004/0068503 A1 | 4/2004 | Peckham |
| 2005/0097561 A1 | 5/2005 | Schumacher et al. |
| 2006/0230207 A1 | 10/2006 | Finkler |
| 2009/0089658 A1 | 4/2009 | Chiu et al. |
| 2012/0078891 A1 | 3/2012 | Brown et al. |
| 2013/0339395 A1 | 12/2013 | Sewall et al. |
| 2014/0035922 A1 | 2/2014 | Watt et al. |
| 2015/0205590 A1 | 7/2015 | Sabne et al. |
| 2015/0268963 A1 | 9/2015 | Etsion et al. |
| 2016/0358098 A1 | 12/2016 | Duesterwald et al. |
| 2017/0329870 A1 | 11/2017 | Lindsley |
| 2018/0007055 A1 | 1/2018 | Infante-Lopez et al. |
| 2018/0052884 A1 | 2/2018 | Kale et al. |
| 2018/0130019 A1 | 5/2018 | Kolb et al. |
| 2018/0158034 A1 | 6/2018 | Hunt et al. |
| 2018/0210966 A1 | 7/2018 | Bedi et al. |
| 2018/0329958 A1 | 11/2018 | Choudhury et al. |
| 2019/0042988 A1 | 2/2019 | Brown et al. |
| 2019/0317994 A1 | 10/2019 | Singh et al. |
| 2020/0226124 A1 | 7/2020 | Chishti et al. |
| 2020/0226156 A1 | 7/2020 | Borra et al. |
| 2020/0242642 A1 | 7/2020 | Thimsen et al. |
| 2020/0250562 A1 | 8/2020 | Bly |
| 2021/0081836 A1 | 3/2021 | Polleri et al. |
| 2021/0295822 A1 | 9/2021 | Tomkins et al. |
| 2021/0406779 A1 | 12/2021 | Hu et al. |
| 2022/0155992 A1* | 5/2022 | Nortman .................. G06F 9/544 |
| 2022/0179910 A1 | 6/2022 | Bharathy et al. |
| 2023/0316128 A1 | 10/2023 | Hodos et al. |

FOREIGN PATENT DOCUMENTS

| | | |
|---|---|---|
| CN | 111373366 A | 7/2020 |
| WO | 2018081633 A1 | 5/2018 |

OTHER PUBLICATIONS

Dayarathna et al (Year: 2014).*
USPTO Non-Final Office Action dated Apr. 18, 2023, U.S. Appl. No. 17/313,769, 22 pages.
International Search Report and Written Opinion mailed Sep. 9, 2021, International Patent Application No. PCT/CN2020/134603, filed Dec. 8, 2020.
USPTO Final Office Action dated Oct. 16, 2023, U.S. Appl. No. 17/313,769, 32 pages.
USPTO Non-Final Office Action dated Feb. 7, 2024, U.S. Appl. No. 17/313,769, 63 pages.
USPTO Non-Final Office Action dated Aug. 8, 2024, U.S. Appl. No. 17/677,904, 13 pages.
European Patent Office Extended Search Report dated Jun. 21, 2024, Application No. 20964530.8, 8 pages.
USPTO Notice of Allowance dated Jan. 16, 2025, U.S. Appl. No. 17/677,904, 10 pages.

* cited by examiner

DYNAMIC BOUNDED MEMORY ALLOCATION

BACKGROUND

A graph database stores data in a graph data structure, referred to as a graph dataset, and executes queries against that graph dataset. A standard graph query language may be used to instruct the graph database with respect to which information a user would like to select and return in query results. For example, developers build applications that rely on graph queries to gain insights into graph datasets. Unfortunately, the performance of a graph database suffers as more information is stored by the graph database. Further, some queries may simply require too much time to be performed in real-time, which is a serious drawback for application developers. Graph databases, and other databases that house large volumes of information, may have sporadic or bursty traffic in the form of queries, which can require a large amount of resources to process during the high traffic times, but otherwise may not need the large amount of resources to process these spikes in queries. With the resource intensive operations of graph and other databases, it can difficult, unfeasible, and inefficient to provision enough resources to handle the high bursts of traffic and have those resources committed to these operations full time.

Relatedly, allocating memory to process certain threads, such as for performing queries on graph or other databases can present challenges. Applications typically request memory from an operating system (OS) (either from internal pools of memory or directly from the OS) of a hardware or virtual computing machine executing the threads. Allocating this memory effectively, to split the available memory between threads, may present challenges, particularly when there is not enough available memory to process all the threads concurrently. In these cases, current systems typically block threads for which not enough memory is available and those threads have to be in effect restarted to be processed, adding overhead and time required to process the threads.

BRIEF DESCRIPTION OF THE DRAWINGS

Various techniques will be described with reference to the drawings, in which.

DETAILED DESCRIPTION

Figure 1:
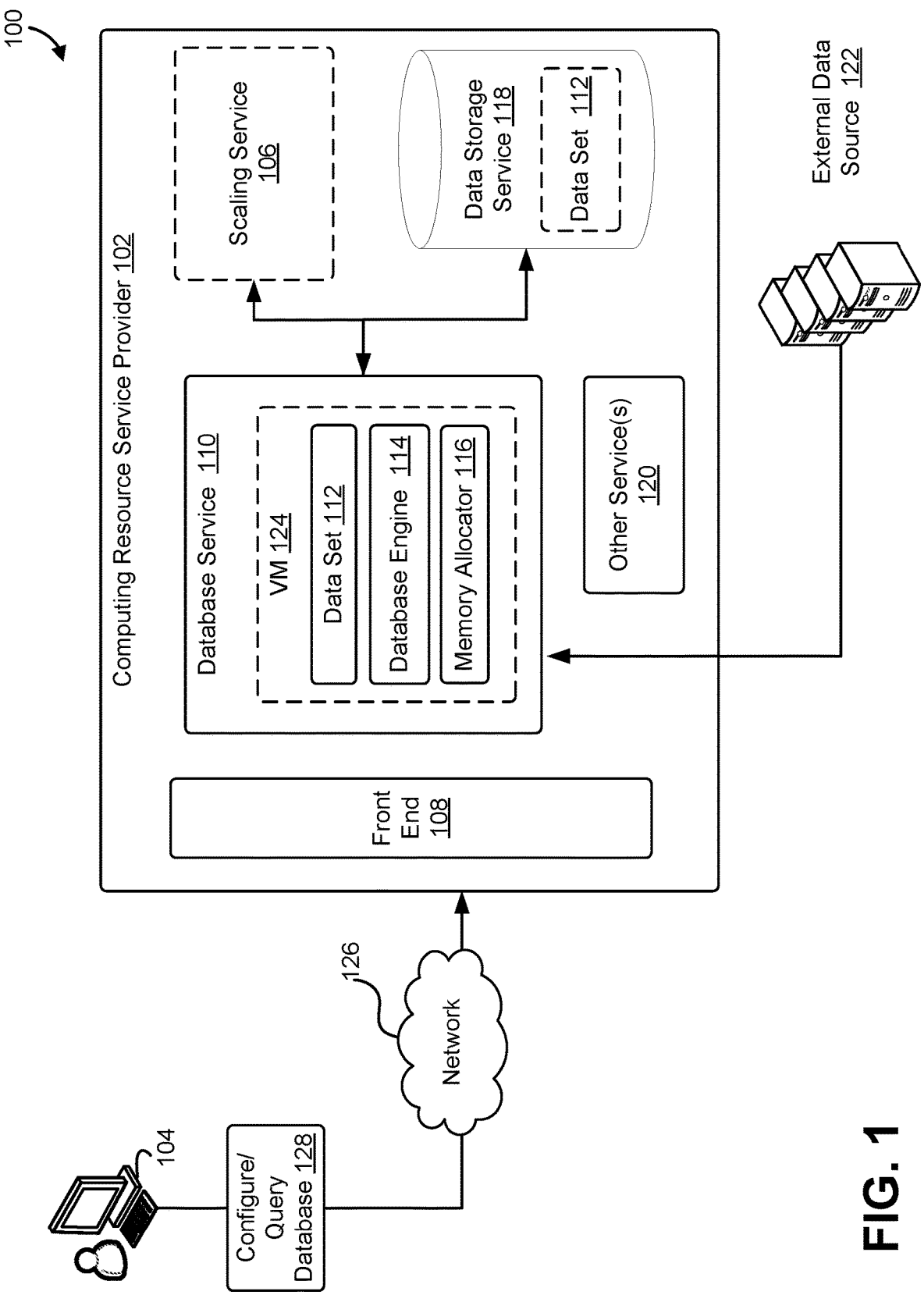
FIG. 1 illustrates an example environment in which the described techniques can be practiced, according to at least one embodiment.

Systems and methods are described herein for dynamically allocating memory to process requests. In some cases, the described systems and techniques may be particularly suited to allocate memory to process requests to access and query data organized into large and/or complex datasets, such as graph datasets stored in graph databases. In some aspects, a graph data base system or service may be provided that organizes and processes requests to organize, store, and access datasets that are highly connected, such as may be organized into edges and nodes (e.g., a graph dataset). The graph database service may receive and process queries of one or more graph datasets (e.g., in the form of one or more threads). The graph database service may provision one or more virtual computing systems to process these requests, and allocate the different graph datasets to different respective virtual computing systems. Each individual virtual computing system (or alternatively, a dedicated hardware computing machine), may manage its own memory usage through a memory allocator.

Prior memory allocation systems would allocate dynamic memory of the system for a given application or process, from the heap memory or internal pools of memory available to the system. The allocation would typically either succeed and then the calling application or process will get a valid pointer for the memory that was allocated or the allocation would fail and then a null pointer is returned. The failure to allocate would be communicated immediately to the caller application and if the application knows some memory will be freed at some point in the future then the application needs to implement proper waiting protocols and monitoring when such memory becomes available.

Failing a memory request immediately is not always desired as in a dynamic system memory can be freed at any time and a future request for memory allocation will actually succeed. Some prior systems attempt to accommodate threads asking for more memory than psychically available by employing demand-paging and memory overcommit, which relies on the assumption that user-space programs mostly do not use allocated memory totally. However, in the applications that use their allocated memory fully, such as database services or engines, neither of these methodologies work to accommodate multiple threads asking for memory more than available in the system. By default, a memory allocator will allocate memory up to the whole memory of the system. Thus, it is very difficult to divide available memory and split it between competing requests or threads.

In light of these limitations of prior systems, the described systems and methods have been developed, in the form of a memory allocator. The described memory allocator may utilize a maximum managed memory size (MAX_MEM), which may be less than the total memory available to the system. In some cases, the MAX_MEM may be allocated separately for individual threads or requests (e.g., with the value determined based on various characteristics of the thread or request). This way, the allocator is not constrained to allocate all memory in the system, but only up to the specified maximum size. This may provide flexibility to limit the memory usage for certain threads, while not exceeding the maximum memory that is available to the system.

When memory is requested, it can be either granted directly from the allocator pools or it can be allocated from new memory that is granted by the operating system (OS). If the current request will cause the allocator to go above the MAX_MEM limit, the request will not fail as with a default allocator. Rather, the thread may be blocked (e.g., temporarily), until more memory become available in the system. In some cases, blocking a thread may be accomplished using a condition variable, such as a POSIX condition variable. When memory is freed or becomes available, the system may check if any threads are blocked in memory allocation pool or queue. If "waiting" threads are identified, they may be notified that more memory is available, such that hat the threads may resend requests to use memory. The notification process may include notifying or updating a condition variable associated with an individual thread. In some aspects, threads and the order of the threads that are notified or activated may be selected based on a priority policy (e.g., FirstComeFirstServe, EarliestDeadline, LeastDemanding, Randomized, etc.). Some of the notified threads will succeed, and some of them may fail because their requests still could not be satisfied, and they may be returned to the waiting state.

In some cases, the described memory allocator may be beneficially implemented with a scalable and/or serverless architecture, where a service, such as a graph database service, may increase or decrease computing resources available to one or more virtual computing machines or instances based on need or changes in resource usage. Under this serverless model, the MAX_MEM value may be adjusted, either up or down. When the system detects that additional memory has been granted, the MAX_MEM can be atomically updated. If the new value is bigger than the current value, then in addition to updating the value, the system may also notify all blocked threads that additional memory is available and that they can retry their acquisition step. Under the serverless model, if the new max value is smaller than MAX_MEM, then the current threads owning memory may continue using the memory. When these threads are completed, and thus release memory to be used by other application or processes, the free memory, may not be allowed to be reused as the system needs to scale down towards the new MAX_MEM value. When successive free memory brings the system below the new MAX_MEM, existing pending memory requests may be able to be satisfied.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) overall reduced memory usage of systems for processing requests; (2) more efficient utilization of computing resources to process threads, such as for accessing large datasets; and (3) other advantages as will be made apparent in the rest of this disclosure.

FIG. 1 illustrates an example environment 100 in which a memory allocator 116, such as may be part of or operate in conjunction with a database service 110, may be provided by a computing resource service provider 102. A client 104 may interact with the computing resource service provider 102 via a front end 108 of computing resource service provider 102 over one or more networks 126 to interact with various data and services, such as through one or more of a database service 110, a virtual machine or compute instance 124, a scaling service 106, a data storage service 118, and/or other services 120, as will be described in greater detail below.

Client 104 may refer to a client computer system or computing device connected to a server (e.g., computing resource service provider) over a network 126. In some cases, client 104 refers to a user or operator of a client computer system and may be an employee of an organization that utilizes a computing resource service provider 102 to interact with various forms of data, such as one or more datasets 112, which may be managed and/or stored by one or more of a database service 110 and a data storage service 118.

Client 104 may submit a request 128 for access to various computing resources (e.g., services or computing resources thereof) of computing resource service provider 102. The request 128, in some examples, is a web service application programming interface request (also referred to simply as a web service request), may be received by a service of the computing resource service provider 102. As illustrated, the client 104 may submit a request 128 to configure, access, query, and otherwise interact with a one or more datasets 112, as may be managed and stored by a database service 110 and/or a data storage service 118. In some cases, the request 128 may be directed to one or more services provided by the computing resource service provider 102, and may include a request to query or locate certain within a data set 112, which may be a graph data set or other collection of data that has interconnections between various points or value in the data (e.g., in an edge and node structure). In yet other cases, the request 128 may include a request to upload or establish a data set 112, manage storage conditions or parameters of the data set 112, and various other operations as would typically be performed on data.

In some examples, request 128 may include one or more of: a query in any of a variety of forms that classifies data in various ways, limits or parameters of what data is returned in response to the query, and so on. In some cases, the request 128 may include parameters to establish a data set 112 and/or load the data set 112 into the database service 110. These parameters may include one or more identifiers or pointers of where the data set is being imported from, such as from an external data source 122 and/or a different data storage service 118, which may also be provided by the computing resource service provider.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of a database service 110, a scaling service 106, a data storage service 118, and/or other service 120 offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106.

In some cases, the network 126 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 126 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 8. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of a database service 110, a scaling service 106, a data storage service 118, and/or other service 120. Each of these services may provide ways for a customer to interact with various forms of data, including using the one or more services to storage and query large amounts of data.

The database service 110 may be a collection of computing resources or processes configured to organize, storage, manage, and run queries on various data sets 112. The database service 110 may be a managed service that makes it easy for users to set up, operate, and scale databases that house data sets 112 in the form of database instances (not illustrated). The database service 110 may rely on the virtualization techniques to allocate the compute and storage resources to provide a database instance. For example, the database service 110 may provision resources of one or more host devices or virtual machine (VM) or compute instances 124 to host a database instance. The database service 110 may provide resizable capacity while managing time-consuming database administration tasks. The database service 110 may provide one or more of a variety of database or query engines 114 (e.g., relational database engines such as MySQL, MariaDB, Oracle, SQL Server, PostgreSQL, etc., graph database engines, such as SPARQL for a Resource Description Framework ("RDF") graph model, Apache TinkerPop Gremlin for a Property Graph model, or a similar graph model and/or query language, and/or non-relational database engines) allowing existing code, applications, and/or tools to work seamlessly with databases provided by the database service 110. In some embodiments, the database service 110 may perform administrative tasks such as automatically backing up databases, upgrading and/or patching database software, scaling the compute resources or storage capacity associated with its database instances, etc.

Users 104 of the database service 110 may interact with the database service 110 to implement one or more databases housing one or more datasets 112, which may include the user 104 utilizing a console of a web-based application to issue one or more requests to an endpoint associated with the database service 110 indicating the user's 104 desire to launch/configure one or more databases. A data set 112 may include various collections of data, including graph data sets, as will be described in greater detail below in reference to FIG. 2. A management engine or controller (not illustrated) of the database service 110 may then, in response, perform operations to obtain compute resources (e.g., virtual machines (VMs) 124 executed by host device(s)) for the database instance(s), launch VM images (optionally having code for the database pre-installed), optionally launch or install databases on the host device(s), configure the database instances, configure security rules and/or permissions used by the databases or used for accessing the databases, etc.

Thereafter, database clients 104 may issue queries to a database instance to read/write data from/to the database. Such database client applications may be executed by electronic devices. As used herein and commonly in the field, the terms "statement," (e.g., text that indicates a command to a database, such as a SELECT statement, UPDATE statement, DELETE statement, etc.) "query," (e.g., SELECT statements or other commands to retrieve data based on specific criteria) and "request" may be used somewhat interchangeably and are to be interpreted as such unless otherwise indicated or made clear by the context of use.

The database service 110 may also include a memory allocator 116, which may be a collection of computing resources or processes for allocating memory within a database instance or VM 124 to process requests or threads for performing operations with respect to one or more data sets 112. In some cases, the database service 110 may configure, host, and/or manage a number of different VMs 124 (or alternatively hardware machines without a virtualization layer) for different data sets. In these cases, each VM 124 may have its own operating system and corresponding memory allocator 116. The memory allocator 116 may implement routines and processes for allocating different portions of memory available to a VM 124, (e.g., heap or other dynamic memory, memory pools, etc.) to process different requests or threads relating to a data set 112, from a client device 104. Memory allocator 116 may manage heap memory of a system, such as VM 124. The memory allocator 116 may primarily provide two application programming interface calls (APIs), one to allocate memory (malloc) and one to free the memory (free). While the described system is primarily described in terms of C or C++ languages, it should be appreciated that the use of other memory allocation APIs are contemplated herein, including alloc, alloca, etc.

As will be described in greater detail below, the memory allocator 116 may utilize one or more schemes to temporarily block certain threads from being executed (e.g., granting memory to those threads so that the threads can be executed), such that the threads may be notified when more memory becomes available, and the threads may resubmit their requests for memory at a future time. In addition, the memory allocator 116 may partition or otherwise separate different blocks or portions of available system memory for responding to and processing different threads via the use of a maximum managed memory size (MAX_MEM) variable. The memory allocator 116 may utilize one or more of these different tools to more efficiently allocate dynamic memory of the VM 124 or system to process a greater number of threads in less time.

The computing resource service provider 102 may also provide a scaling service 106, which may be a collection of computing resources or processes for allocating different resources and changing resource allocations for various VMs 124 managed by the database service 110. In some cases, the scaling service 106 may configure and provision different physical resources to provide one or more VMs 124 to the database service 110 for storing and managing access to various data sets 112/databases. In some cases, the scaling service 106 may allocate various resources, such as provided by data storage service 118, and/or database service 110, to various VMs 124, for processing threads in relation to various data sets 112, including memory, CPU, and/or bandwidth resources.

In yet some cases, the scaling service 106 may provide a serverless database service 110, such that scaling of various resources for the database service 110 (e.g., different VMs 124 for different data sets 112), may be done automatically in response to changes in usage or need of the different VMs 124. In some cases, based on changes in resources provided by a scaling service 106 to a VM 124, the memory allocator 116 of that VM 124 may make corresponding adjustments to the maximum managed memory (MAX_MEM) value of the system, to enable seamless and efficient scaling of resources in allocating memory to process different threads. Examples of this process will be described in greater detail below.

In some examples, the computing resource service provider 102 may additionally or alternatively provide data storage through a data storage service 118. In some cases, the data storage service 118 may interact with the database service 110, scaling service 106, and/or other services 120 to facilitate storing and querying data sets 112. In some cases, the database service 110 and the data storage service 118 may be different services, running on different resources, etc. In other cases, the database service 110 and the data storage service 118 may combine some or all functionality, computing resources, etc.

In some aspects, the data storage service 118 may be an on-demand data storage service, such as an object-based data storage service, and may be configured to store various forms of data. The data storage service 118 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 118, which may collectively form data sets 112, may be organized into data objects. The data storage service 118 may store numerous data objects of varying sizes. The data storage service 118 may operate as a key value store that associates data objects with identifiers of the data objects which may be used by the client 104 to retrieve or perform other operations in connection with the data sets 112 stored by the data storage service 118. Access to the object-based data storage service 118 may be through application programming interface (API) calls to the service or via an interface, such as a graphical user interface (GUI).

In some aspects, a data set 112, either stored by database service 110 or data storage service 118, may include data obtained from a specific application or service, such as virtual computing resources including virtual machines, containers, etc., data storage services, and other services or entities running within or outside of the computing resource service provider. In some cases, the data set 112 may include any of a number of different data sources and different types of data sources, such as from a Software as a Service (SaaS) application, a relational database or service, or other data source 122. In some cases, the customer, such as in a request 128, may specify the data set 112, such as via any type of an identifier, including IP address, resource name, such as may be assigned by a computing resource service provider 102 that provides the service or data source, or via other types of identifiers. In some cases, the data storage service 118 may operate as a key value store that associates data objects with identifiers of the data objects which may be used by the client 104 to retrieve or perform other operations in connection with the data objects stored by the data storage service 118. Access to the data storage service 118 may be through application programming interface (API) calls to the service, for example from either directly from client 104, or via the computing resource service provider 102. It should be appreciated that the data storage service 118 may additionally or alternatively provide non-object-based data storage, such as block data storage, table-oriented data storage, relational databases, file-based storage, and the like.

Figure 2:
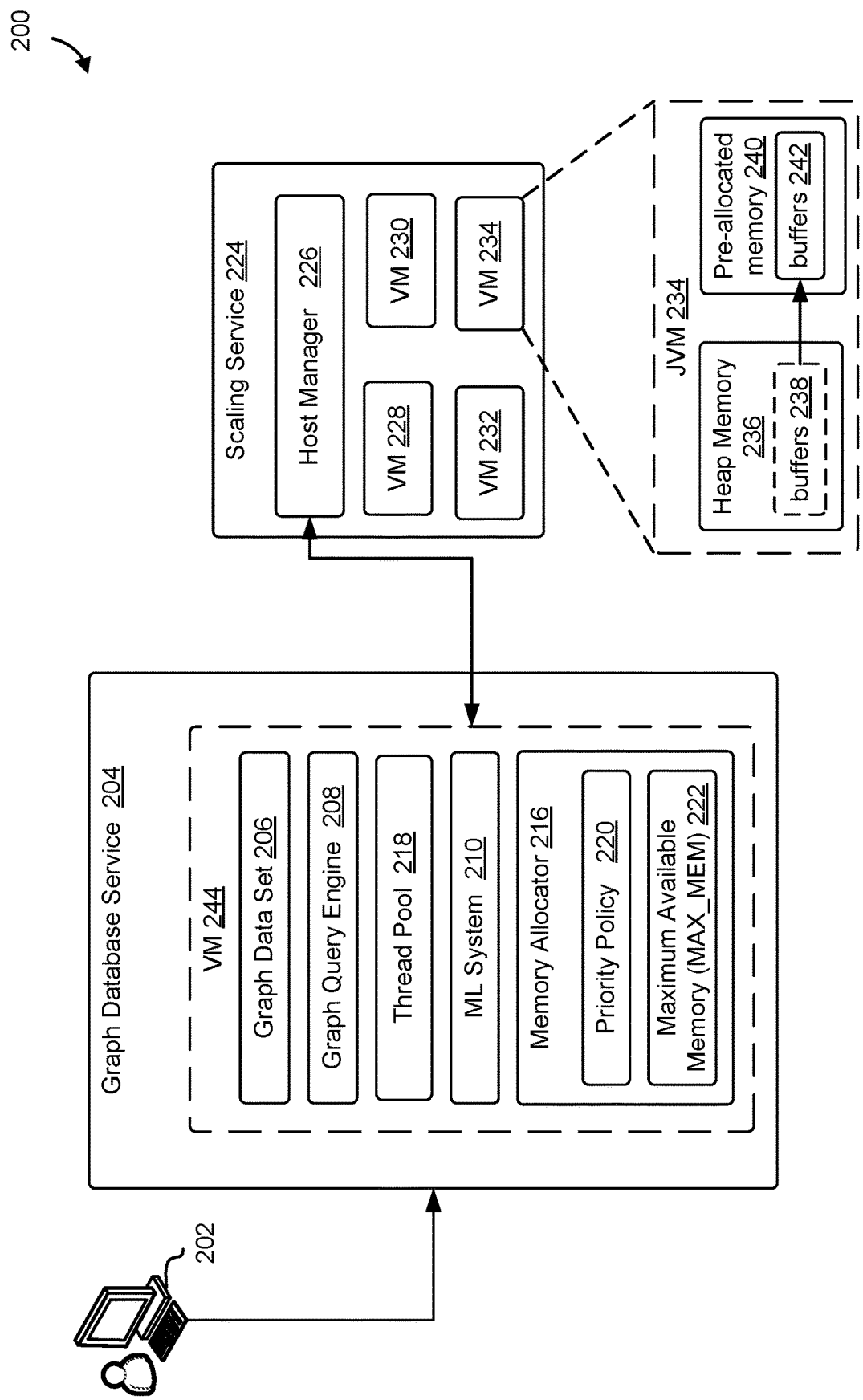
FIG. 2 illustrates an example of a graph database service, according to at least one embodiment.

FIG. 2 illustrates an example of a graph database service 204 interacting with a scaling service 224. In some aspects, graph database service 204 may include one or more aspects of database service 110 described above in reference to FIG. 1. In some examples, the scaling service 224 may include one or more aspects of scaling service 106, also described above in reference to FIG. 1. As illustrated, a graph database service 204 may provide one or more VMs or other computer system 244, which may be managed by a scaling service 224 and/or a host manager 226 thereof, for storing and managing access to one or more graph data sets 206.

The graph database 204 is configured to store data in a graph data structure, referred to as a graph dataset 206, and execute queries against the graph dataset. In particular, highly connected datasets may benefit from being stored in a graph dataset. Within the graph dataset, the data is organized into nodes and edges. Each edge connects a pair of related nodes to one another and provides information about that relationship. For example, the nodes in the graph dataset may each represent a different technical paper and each of the edges may indicate that a first technical paper represented by a first node cites a second technical paper represented by a second node. Each of the nodes may have one or more properties or parameter values associated therewith. For example, each of the nodes representing a different technical paper may be associated with parameter values storing data related to the technical papers. By way of non-limiting examples, such nodes may each be associated with parameter values representing author(s), topic(s), publication date, journal name, title, and the like. Further, the edges may include multiple sets of edges with each set representing a different type of relationship. For example, as mentioned above, a first set of the edges may represent citations amongst the papers represented by the nodes and a second set of the edges may represent a subsequent paper commenting on an earlier paper.

The graph dataset may be queried using a standard query language, such as SPARQL for a Resource Description Framework ("RDF") graph model, Apache TinkerPop Gremlin for a Property Graph model, or a similar graph model and/or query language. In the embodiment illustrated, the graph database 204 is configured to receive graph queries and execute them against one or more graph datasets 206 stored by the graph database 204. The graph database 204 may be configured to understand custom commands and/or parameters added to a graph query that are not part of a standard graph query language (e.g., Apache TinkerPop Gremlin, SPARQL, and the like). The custom commands and/or parameters may identify one or more machine learning models provided by a machine learning (ML) system 210, (against which the graph query is to be executed. In other words, the standard graph query language may be extended to include these additional commands and/or parameters. Alternatively, a non-standard graph query language may be used that includes these or similar commands and/or parameters. Thus, when the graph database 204 receives a graph query, the graph database 204 is configured to identify whether the graph database 204 needs to perform the graph query against the graph dataset(s) 206 or forward the graph query to the ML system 210 for processing. For example, when the graph database 204 receives the graph query, the graph database 204 reads the custom commands and/or parameters included the graph query, determines that the graph query needs to be performed by the ML system 210, formulates an invoke endpoint request that includes the graph query, and forwards the invoke endpoint request to the ML system 210.

The ML system 210 is an application or service implemented by one or more ML servers or computing systems (e.g., operating at least in part within the virtual private cloud). The ML system 210 is configured to receive the invoke endpoint request, execute an ML model using information included in the invoke endpoint request, produce an output graph dataset, perform the graph query against the output graph dataset to obtain a query result, and forward an invoke endpoint response with the query result to the graph database 204. By way of non-limiting examples, the ML system 210 may be used to perform one or more of the following tasks:

Classify one or more nodes (e.g., predict whether a particular node is fraud or not);
Classify one or more edges (e.g., predict one or more labels for a particular edge);
Predict an edge;
Find one or more target nodes (e.g., predict a target node for a particular source node and set of edge labels);
Find one or more source nodes; and
Find one or more edge labels (e.g., predict an edge label for an edge connecting a source node and a target node). Further, the ML system 210 may be configured to build, train, and deploy various ML models.

The graph database 1204 may receive the invoke endpoint response with the query result, formulate a query response, and forward the query response to the entity that sent the graph query to the graph database 204. In alternate embodiments, the graph database 204 may forward the query response to the automated process when the automated process 106 sent the graph query to the graph database 204. Additional details concerning using ML models to enhance graph database functionality are found in U.S. patent application Ser. No. 17/313,769, titled USING GRAPH QUE-RIES TO OBTAIN RESULTS FROM MACHINE LEARNING MODELS, filed May 6, 2021, the contents of which are herein incorporated by reference in their entirety.

As also illustrated in FIG. 2, the graph database service 204 may also include a thread pool 218 which may interact with a memory allocator 216, which may further include a priority policy 220 and may store and manage one or more a maximum managed or available memory size values 222 (MAX_MEM values). In some aspects, memory allocator 216 may include one or more aspects of memory allocator 116 described above in reference to FIG. 2. The thread pool 218 may be any storage resource managed or available to graph database service 204/VM 244, which may store and process various threads for the operating system of the VM 244/graph database service 204. Each thread may be a task or process to be executed by VM 244/graph database service 204, including operations to be performed on one or more graph data sets 206. Examples of threads may include queries to be performed against the graph data set 206, tasks relating to establishing or configuring the graph dataset, such as defining edges, nodes, and other parameters of the graph data set 206, tasks relating to training one or more ML models to be used for modifying and/or querying a graph data set 206, and various other operations as are typically performed on data sets stored in a database. The threads themselves may include or be associated with a request for an amount of memory needed to process the thread. In some cases, the threads themselves may have an indication of the amount of memory each needs to be processed, and in other cases, another component, such as the thread pool 218 or memory allocator 216 may determine how much memory a give thread will need to be processed.

In some cases, the memory allocator 216 may select which thread will be processed next based on any of a number of factors. In yet some cases, individual threads will request resources from the memory allocator 216, such that the threads themselves initiate the process, and the memory allocator 216 approves or denies the request based on what resources are available. When memory is requested by a thread, it can be either granted directly from the allocator pools or it can be allocated from new memory that is granted by the OS of the system, such as VM 244, by the memory allocator 216. If not enough memory is available for the thread to be processed, the thread may be blocked. The techniques described herein provide for a mechanism to temporarily block a thread, such that it can be notified in the future, such as when more memory resources become available, so that the thread can be processed, without the originating caller application or process having to submit a new request or thread.

In some cases, the memory allocator 216 may implement a priority policy 220, which may include a schema for determining which threads are processed and in what order, particularly when memory resources are limited or less than the total memory needed to process all of the threads pending at a given point in time. In one example, the priority policy 220 may be first come first serve policy, such that threads may be processed in the order they are received. In some cases, this policy may utilize a timestamp associated with the thread (such as when the thread was received by the graph database service 204, or the VM 244), to determine which order to process threads in. In another example, the priority policy 220 may be an earliest deadline priority policy. This type of priority policy 220 may be utilized to select threads having an earliest deadline or completion time, which may be associated with the thread itself. In yet another example, the priority policy 220 may be a least demanding type of policy, where threads that do not have a pending deadline or are associated with operations that are not of high importance (e.g., a background process, not involving a query), may be associated a less priority, such that other threads may be processed first. In another example, the priority policy 220 may be a randomized one. In yet some examples, the priority policy 220 may key off of any metadata or information included with a thread, such as various timestamps of when certain events occur with respect to the thread, deadlines, resource requirements, type of request (e.g., query v. non-query), or various other factors. The priority policy 220 may be configurable, such as externally by sending a signal to a running process or automatically by an in-process module that monitors the system and decides which policy is appropriate (e.g., the priority policy implemented may changed during execution based on a change in the size of threads in the thread pool).

In some cases, the memory allocator 216 may track one or more maximum managed memory (MAX_MEM) 222 values for the graph database service 204, the VM 244, graph data set 205, and/or individual threads that may be stored in the thread pool 218. The MAX_MEM value may indicate a maximum amount of memory resources that are usable to allocate to one or more threads by the memory allocator 216. In some cases, the memory allocator 216 may set or determine a MAX_MEM value such that it is less than the total memory available to the memory allocator 216 or system (e.g., service 204 or VM 244), to reserve memory for allocating to other threads in the future.

In some cases, the memory allocator 216 may set a MAX_MEM value for the graph database service 204, or on a more granular scale for an individual graph data set 206 or VM 2454. In some cases, the memory allocator 216 may set a MAX_MEM value for individual threads or groups of threads, such as based on one or more characteristics of the threads. In some cases, this may include setting the MAX_MEM at a specific value based on the type of thread (e.g., a query or other operation), complexity of the thread (e.g., how many individual tasks are contained in the thread, how complex a query is, whether or not ML processing is needed to process the thread, etc.), size of the graph data set 206 (e.g., based on a determination of how much memory will be needed to process the thread based on a size of the graph data set), other characteristics of the graph data set 206, variable or parameter associated with processing the thread (e.g., time of day, relative load of the system, number of threads waiting in the thread pool), and so on. One or more of these parameters may be used and/or combined to form ranges of the MAX_MEM value for certain threads. In some cases, a certain value of MAX_MEM may be automatically selected by the memory allocator 216 based on one or more of these parameters to efficiently allocate memory to the threads, while minimizing processing required to select a MAX_MEM value for individual thread based on a large number of parameters. For example, if a thread is for a query and the thread pool does not have a large number of threads waiting, then a high MAX_MEM value may be selected. In another example, when a thread is for some type of background process (e.g., cleaning up the graph data set 206, a backup process, etc.), and the thread pool has a large number of pending threads, then a lower MAX_MEM value may be selected.

In some cases, the memory allocator 216 may change one or more of the MAX_MEM values, or update one or more MAX_MEM values for one or more threads based on a change in resources allocated to the graph database service 204 or VM 244, such as may be managed by a scaling service 224. Being able to change the MAX_MEM value based on changes in resources allocated to the system (e.g., up or down) may provide for more efficient dynamic allocation of resources and may provide a system that can achieve higher efficiency usage in memory resources.

The scaling service 224 may be a managed service and may provision and manage resources for a number of virtual computing resources, such as VMs 228-234 and 244. It should be appreciated that while VMs are primarily described in this disclosure, that other virtual and non-virtual computing resources are contemplated herein, including dedicated hardware machines, software containers that may share an operating system and/or various other computing resources, and so on. In some cases, the scaling service 224 may also include a host manager 226, which may be a set of computing resources or processes that manage changing resource allocations to one or more VMs 228-234, and 244. A host manager may be associated with an individual VM, or be shared across multiple VMs. In some cases (not illustrated), a host manager may reside within a virtual machine, such as VM 244.

The host manager 226 may obtain resource usage data of a VM 244, such as how much memory is being used by VM 244, how much CPU, how much bandwidth, and various other resources usage data. The usage data may be obtained continuously, periodically, aperiodically, or upon the occurrence of one or more triggering events. In one example, resource usage data may be obtained every second, every 30 seconds, every minute, every hour, etc. This information may be utilized by the scaling service 224 to make determinations as to whether additional resources need to be proviso end for a given VM. In some examples, memory allocator 216 may provide this information to the host manage 226, so that the host manager 226/scaling service 224 may adjust resource allocations to VM 244. In some cases, adjusting resource allocation may include increasing one or more resources accessible to the VM 244, or may include migrating the VM to a VM having a different resource profile, to accommodate changes in traffic to (e.g., number of queries submitted) the graph database service 204. In yet other cases, adjusting the resource allocation of a VM 244 may include provisioning an additional VM to work in tandem with VM 244.

In some cases, if the current thread/request will cause the memory allocator 216 to go above the MAX_MEM limit, the request will not fail as with a prior memory allocation systems. Rather, the memory allocator 216 may block (e.g., temporarily until more memory becomes available) the calling thread using one or more condition variables to enable notifying the thread of a change in available resources in the future. In some cases, a POSIX condition variable may be used. In yet other cases, other condition variable types or schemes many be used. Condition variables provide one way for threads to synchronize, by allowing threads to synchronize based upon a value of data. Condition variables may be used to reduce the amount of polling needed by the thread to determine a time when enough resources are available to process the thread, and resources necessary for polling. Without condition variables, a process (or operator) would need to continually poll, to check if a condition is met. This can be very resource consuming since the thread would be continuously busy in this activity. A condition variable is a way to achieve the same goal without polling.

When memory is freed or becomes available, the memory allocator 216 will check if any threads are blocked (e.g., pending in the thread pool 218) and it will notify the condition variable of those threads. This notification will wake some or all blocked threads in a specific order configurable by the priority policy 220, and the awakened threads may retry the memory acquisition step. At this point one or more threads will wake up and they will try to acquire memory just became available. The priority policy 220 may determine which order of thread should be woken up or activated to prioritize the threads. In other examples, other schemes may be utilized to temporarily block threads from being processed, including various polling schemes, or other schemes, as are known in the art.

In some examples, the described system 200 may support serverless automatic scaling behavior, that is triggered based on resource usage where resource is either memory, CPU or network. For example, if the current memory usage goes above a certain threshold for a given VM 228-234, 244, then the system can be scaled up and additional memory becomes available. Similarly, when memory usage goes below a certain threshold and memory is returned from the application memory allocator to the OS, then resources are scaled down and total physical memory available to the application is reduced. The scaling service 224 may monitor memory usage by means of monitoring the native memory allocator 216 of individual systems/VMs, and scaling decisions may be made based on the amount of memory use reported by this module.

In some cases, one or more of VMs 228-234, 244 may include a java virtual machine, such as java virtual machine 234. In this scenarios, dynamically allocating memory to the JVM 234, such as by scaling service 224, may present challenges, as the heap memory of a JVM 234 is typically not modifiable once the JVM 234 has been instantiated. JVM 234 may operate in a manner such that it can't easily adapt to these memory variations. The java maximum heap memory 236 is currently specified when the JVM 234 starts, and it cannot be changed dynamically at runtime. Thus, JVM 234 may not be able to directly accommodate additional memory granted to an application running in the JVM 234, as it cannot use more than the initial specified value. To allow for java applications to benefit from memory scaling as described herein, memory allocation may be adapted fort JVMs to use natively allocated byte buffers. In this model, data structures may be adapted such that rather than them being allocated on the heap at 238, these data structures and can be allocated within pre-allocated memory buffers 242 of pre-allocated memory 240. These pre-allocated memory buffers 242 can be dynamically provisioned by having the java application perform allocations by means of a native memory allocator, such as malloc.

In this model, a very small dynamic library may be built (e.g., using C or C++ language). This library may implement the alloc and free APIs by calling the underlying malloc implementation. The library may also provide the proper java native interface calls such that java now rather than allocating memory regions (byte buffers) from the JVM heap 236, will allocate memory with these primitives and implicitly use the native memory allocator. Under this new behavior, now when java allocates memory it can go beyond the maximum java heap memory limit set 236 at the JVM 234 initialization. The ability to use more memory from the underlying memory allocator can allow for a JVM 234 to be scaled and beneficially interface with scaling service 224, to enable dynamic memory allocation for processing threads.

In some aspects, a different VM 244 may be provisioned for individual graph datasets 206, where one or more of components 206, 208, 210, and/or 216 may be implemented specifically for that VM 244. In other cases, graph database service 204 may implement multiple VMs 244, which may share on or more of these components.

Figure 3:
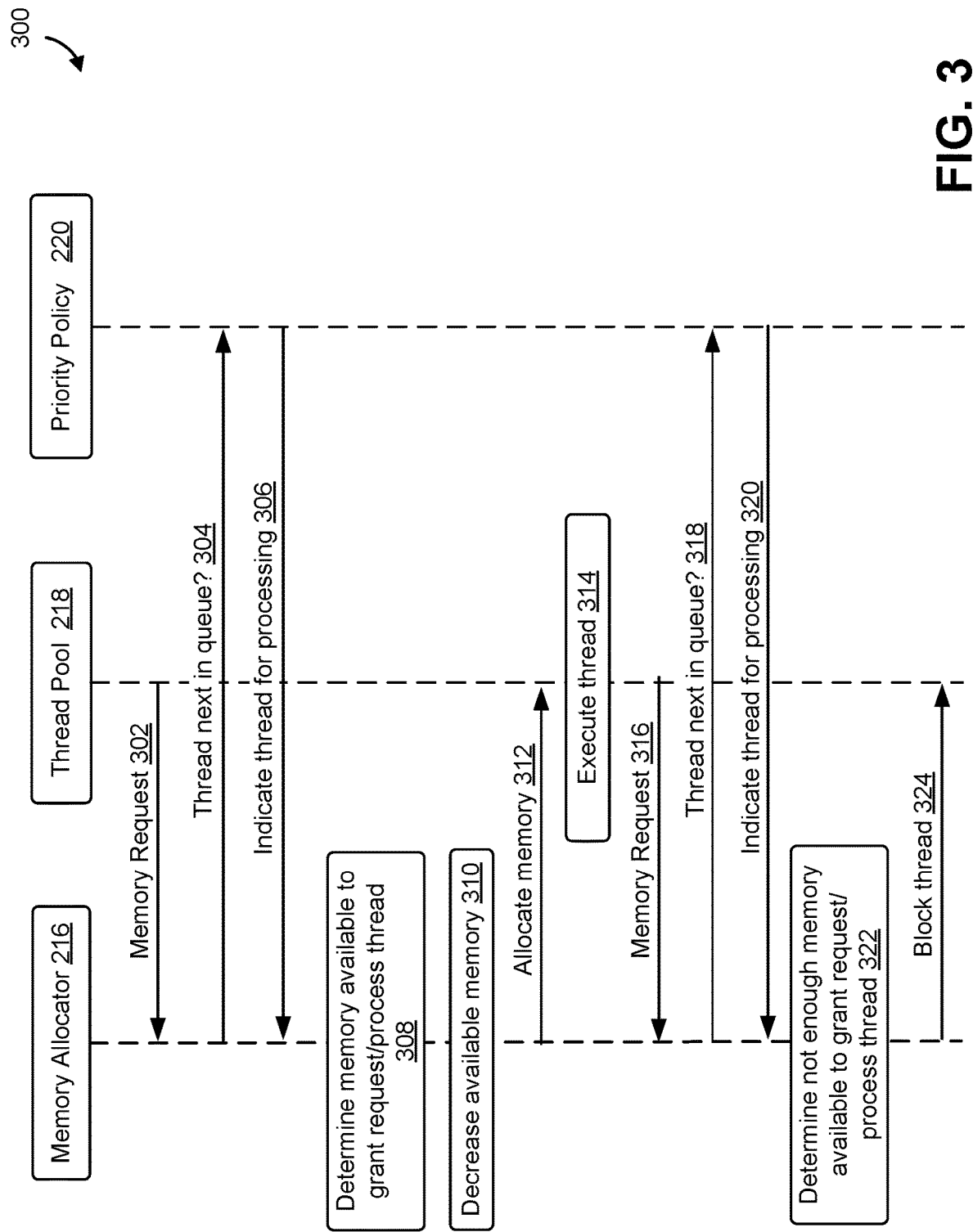
FIG. 3 illustrates example communications between a memory allocator, a thread pool, and a priority policy, which may be provided by a graph database service described in reference to FIG. 2, according to at least one embodiment.

FIG. 3 illustrates example communications 300 between a memory allocator, a thread pool, and a priority policy, such as memory allocator 216, thread pool 218, and priority policy 220, which may be provided by a graph database service, such as graph database service 204 described in reference to FIG. 2. It should be appreciated that communications 300 may be similarly utilized beneficially in other database contexts beyond graph database applications.

In some aspects, a thread, such as may be stored (e.g., temporally) in a thread pool 218, may send a request to memory allocator 216 for memory, at operation 302. The request may include an amount of memory needed by the thread to complete one or more tasks associated with the thread. The memory allocator 216, responsive to the request, may verify with priority policy 220 that the thread is next up in queue or is otherwise prioritized for processing, at operation 304. The priority policy 220 may return an indication of the next thread in queue for processing/an indication whether the indicated thread is eligible for processing, at operation 306. Either upon receiving the response/result of determining a priority of the thread, or upon receiving the memory request from the thread, at operation 302, the memory allocator 216 may determine if there is enough available memory to the system to grant the request and process the thread, at operation 308. In some cases, operation 308 may include comparing the memory indicated in the request to a MAX_MEM value, rather than to the total memory available to the system, to more efficiently and intelligently allocate memory resources of the system. Upon determining that enough memory is available, the memory allocator may decrease the amount of available memory for allocation, at operation 310. Next, the memory allocator 216 may allocate the requested memory to the thread, at operation 312, such that the thread can execute, at operation 314. In some cases, operation 312 may include returning a pointer or other identifier of the memory location that corresponds to the memory granted to the thread.

In a similar way, the memory allocator 216 may interact with thread pool 218 and a priority policy or process 220 to determine if enough resources are available to grant requests by various threads, on an ongoing basis. In some aspects, threads may be processed in parallel, such that the memory allocator 216 may determine whether to allocate memory to various threads concurrently. In some cases, the memory allocator 216 may determine that not enough memory is available to satisfy a request, for example, at operation 322. Operation 322 may be preceded by the memory allocator 216 receiving a memory request at operation 316, and verifying priority with priority policy 220 at operations 318 and 320. In this scenario, the request/thread may be blocked, at operation 324. Operation 324 may include setting a condition variable associated with the thread (or using some other similar mechanism), such that upon more memory becoming available, the memory allocator 216 may notify the thread, which may trigger the thread again requesting memory form the memory allocator.

Figure 4:
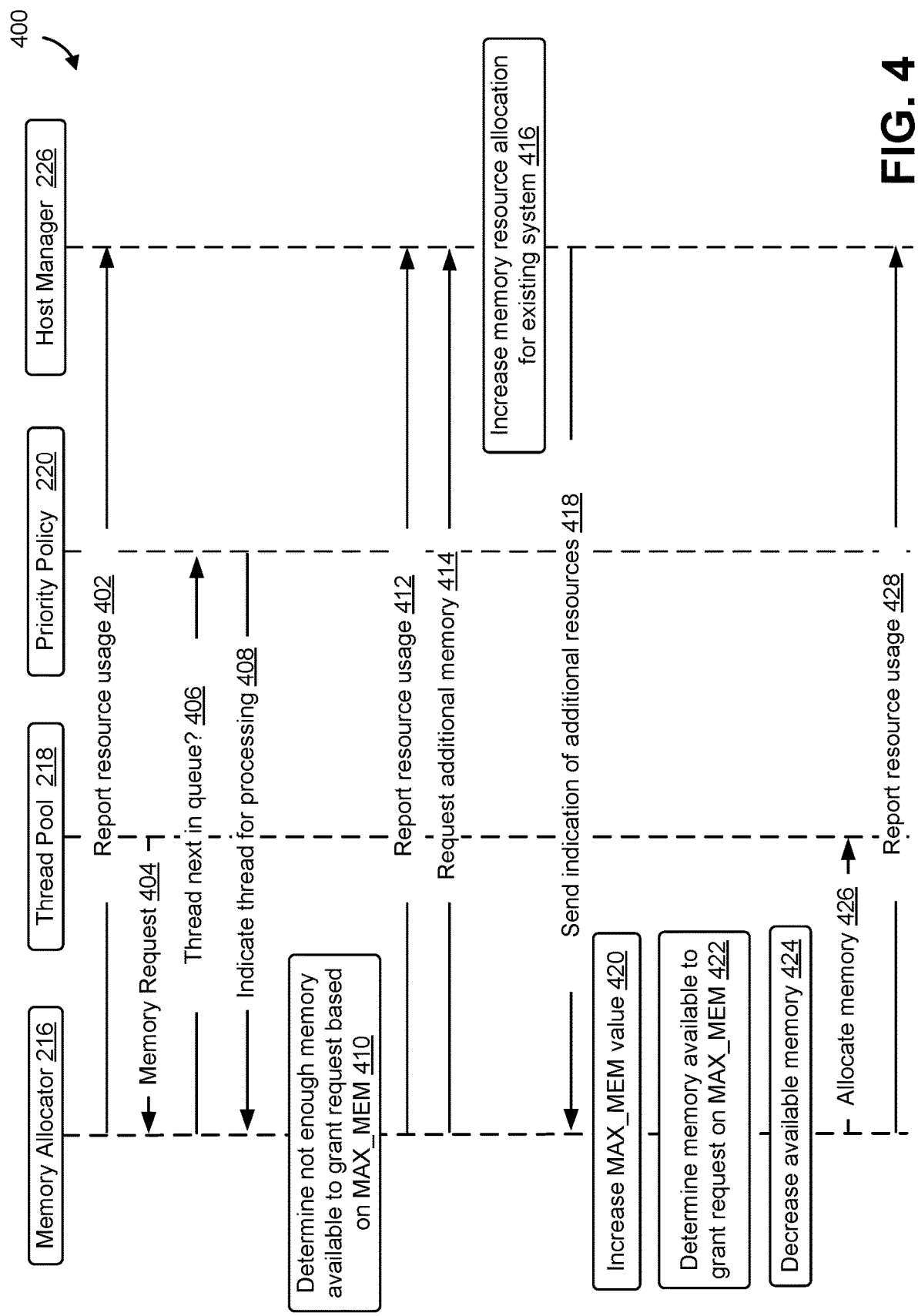
FIG. 4 illustrates example communications between a memory allocator, a thread pool, a priority policy, and a host manager, which may be provided by a graph database service described in reference to FIG. 2, according to at least one embodiment.

FIG. 4 illustrates example communications 400 between a memory allocator, a thread pool, a priority policy, and a host manager, such as memory allocator 216, thread pool 218, priority policy 220, and host manager 226, which may be provided by a graph database service and/or scaling service, such as graph database service 204 and scaling service 224 described in reference to FIG. 2. Communications 400 may be similar to communications 300 described above in reference to FIG. 3. However, FIG. 4 contemplates the memory allocator 216 operating within a scalable database system, such as may be facilitated by a scaling service 224. It should be appreciated that communications 400 may be similarly utilized beneficially in other database contexts beyond graph database applications.

In the example illustrated, the memory allocator 216 may report memory usage to a host manager, such as host manager 226 described above in reference to FIG. 2. In some examples, the memory allocator 216 may report the memory usage periodically, such as at regular intervals, represented by operations 402, 412, and 428. In other cases, operations 402, 412, and 428 may be performed at different time intervals, such that they are not reported periodically.

In some aspects, a thread, such as may be temporally stored in a thread pool 218, may send a request to memory allocator 216 for memory, at operation 304. The memory allocator 216, responsive to the request, may verify with priority policy 220 that the thread is next up in queue or is otherwise prioritized for processing, at operation 406. The priority policy 220 may return an indication of the next thread in queue for processing/an indication whether the indicated thread is eligible for processing, at operation 408. Either upon receiving the response/result of determining a priority of the thread, or upon receiving the memory request from the thread, at operation 404, the memory allocator 216 may determine if there is enough available memory to the system to grant the request and process the thread, at operation 410. In some cases, operation 410 may include comparing the memory indicated in the request to a MAX_MEM value, rather than to the total memory available to the system. Upon determining that not enough memory is available, the memory allocator 216 may request additional resources from the host manager 226 at operation 414. The host manager 226, may in return, increase the memory allocated to the VM or system upon which the memory allocator 216 is operating, at operation 416, and send an indication of additional resources/a grant of the resources, at operation 418. The memory allocator 216 may in turn, increase the MAX_MEM value accordingly, at operation 420, and determine, using the new MAX_MEM value, that there is enough memory to grant the request, at operation 422. The amount of available memory may then be decreased, at operation 424, by the memory allocator 216, to reflect the memory being utilized by the thread. The memory allocator 216 may allocate memory to the thread, at operation 426, so that the thread can execute. In some cases, operation 426 may include returning a pointer or other identifier of the memory location that corresponds to the memory granted to the thread.

In some cases, rather than actively requesting memory from the host manager 226, the host manager may automatically scale resources allocated to the system of the memory allocator 216, and grant the additional resources, when needed, to the memory allocator 216, without the memory allocator 216 explicitly requesting more resources. Similarly, both an explicit request or an automatic change in resource allocation to a memory allocator may be used in the case of decreasing resources allocated to the memory allocator.

Figure 5:
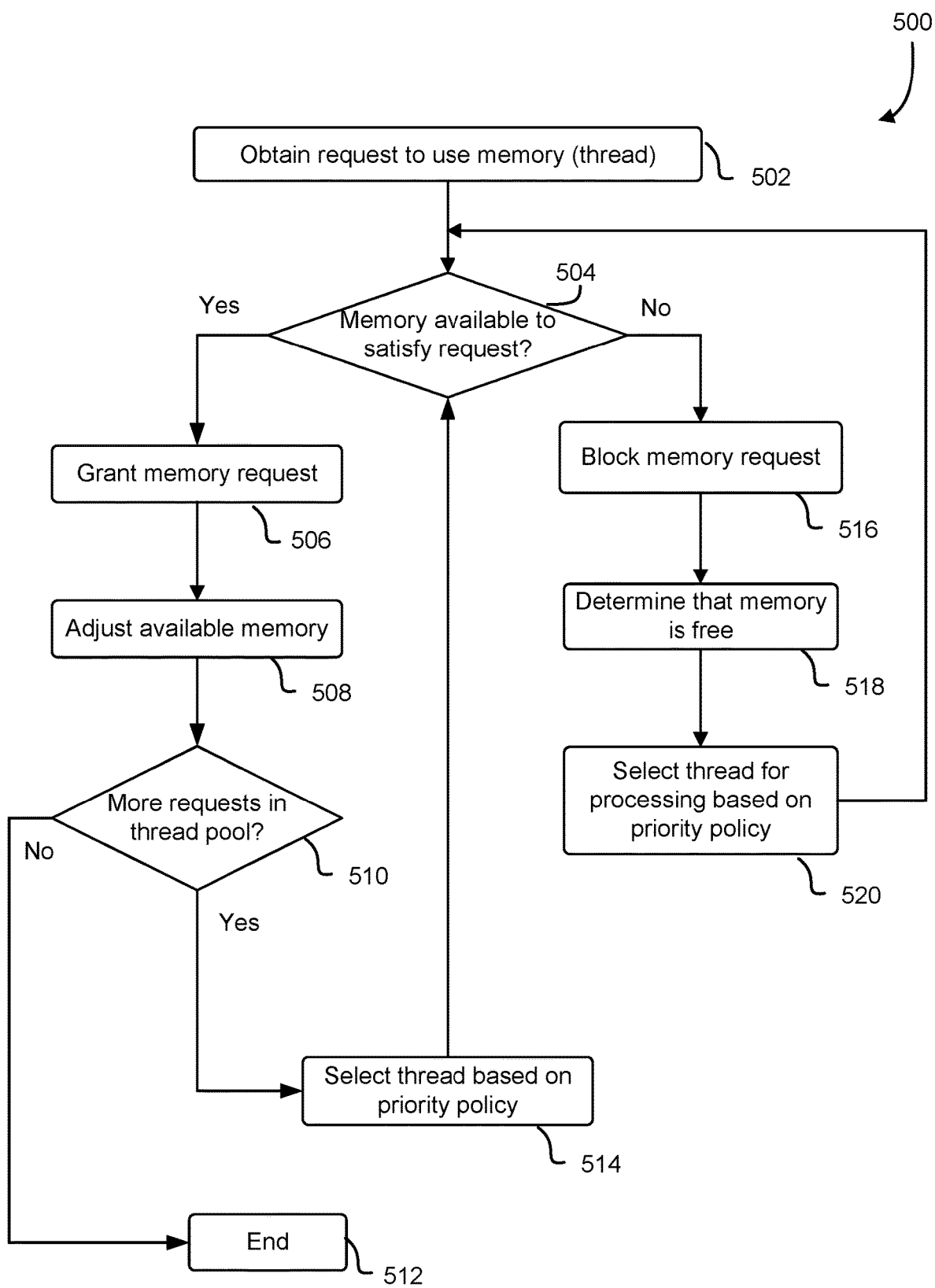
FIG. 5 illustrates an example process for dynamically allocating memory to a thread, according to at least one embodiment.

FIG. 5 illustrates an example process 500 for dynamically allocating memory to a thread. In some aspects, process 500 may be performed by one or more of a database service 110, a graph database service 204, a scaling service 106, 224, a VM 124, 224, or various components thereof, including a memory allocator 116, 216, database engine 114, 208, or ML system 210 described above in reference to FIGS. 1 and 2. In some cases, process 500 may utilize one or more communications between different of these various components and systems, such as including communications 300 and/or 400 described above in reference to FIGS. 3 and 4.

Process 500 may begin at operation 502, in which a request to use memory of a system (e.g., relating to or associated with a thread to perform an operation with respect to a database or dataset, such as a graph data base/data set) may be obtained, such as by a memory allocator. Next, the memory allocator may determine if there is enough available memory to satisfy the request, at operation 504. In some cases, operation 504 may include comparing the requested amount of memory to a maximum managed memory value, which may be less than the total available memory of the system. If there is enough memory, the memory request may be granted at operation 506, and the available memory, as tracked by the memory allocator, may be decreased at operation 508. Next it may be determined if there are more threads waiting to be processed, such as may be maintained in a thread pool, at operation 510. If more threads are waiting, then a next thread may be selected for processing, for example, based on a priority policy, at operation 514. Process may then return to operation 504. In the case no more threads are available, process 500 may end at 512.

In the case there is not enough memory to satisfy a request, as determined at operation 504, process 500 may proceed to operation 516, where the thread may be blocked. In some cases, the request may only be temporarily blocked, or blocked until there are more resources available to satisfy the request, at operation 516. In some cases, operation 516 may include setting a condition variable associated with the thread, such that the thread can be notified effectively when new memory resources become available, and can resubmit the memory request. In some cases, at some point after operation 516, the system/memory allocator may determine that more memory has become available, such as in response to resources being freed upon completion of a thread, more resources being allocated to the memory allocator (e.g., a maximum managed memory value being increased), etc., at operation 518. In some cases, both of the conditions may occur and trigger the memory allocator to make the determination, at operation 518.

At this point, a new thread may be selected for processing based on a priority policy, for example, at operation 520. Process 500 may then loop back to operation 504. In some examples, operation 520 may alternately include selecting the thread that was just blocked, without going through a priority determination. In yet some cases, operation 520 may include determining that enough memory resources are not available for processing the blocked thread, prior to notifying the blocked thread (or another thread from the thread pool according to a priority policy) that it can resubmit its memory allocation request.

Figure 6:
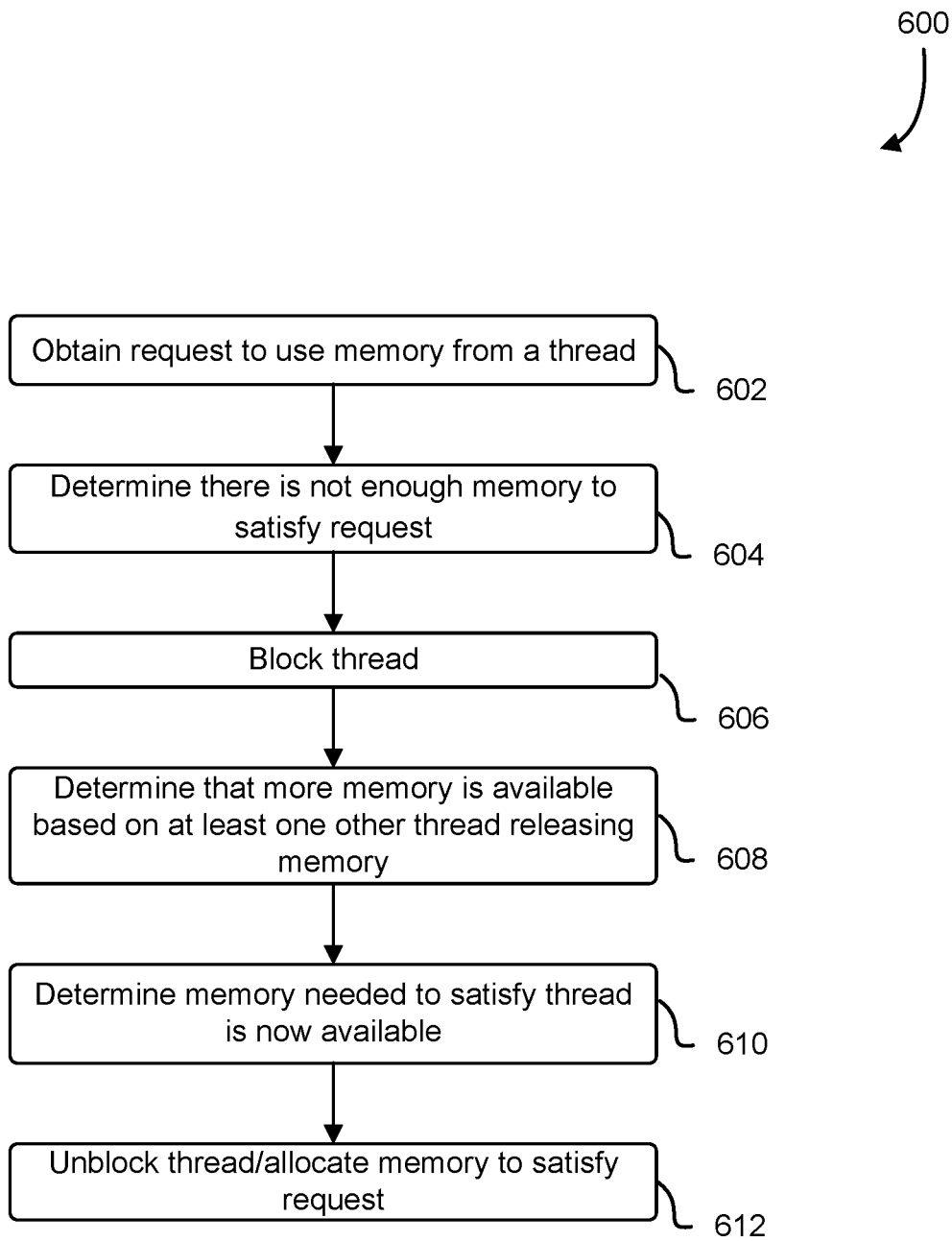
FIG. 6 illustrates another example process for dynamically allocating memory to a thread, according to at least one embodiment.

FIG. 6 illustrates another example process 600 for dynamically allocating memory to a thread. In some aspects, process 600 may be performed by one or more of a database service 110, a graph database service 204, a scaling service 106, 224, a VM 124, 224, or various components thereof, including a memory allocator 116, 216, database engine 114, 208, or ML system 210 described above in reference to FIGS. 1 and 2. In some cases, process 600 may utilize one or more communications between different of these various components and systems, such as including communications 300 and/or 400 described above in reference to FIGS. 3 and 4.

Process 600 may begin at operation 602, in which a memory allocator may obtain a request to use a specified amount of memory from a thread. The memory allocator may determine, at operation 604, that there is not enough available memory to satisfy the request. In some cases, operation 604 may include comparing the requested memory associated with the request to a maximum available memory of the system, which may be otherwise limited by a maximum managed memory value or MAX_MEM value. In light of operation 604, the memory allocator may block the thread, at operation 606, such as by associating a condition variable with the thread.

At some point in the future, the memory allocator may determine that more memory has become available for allocation, such as may be the result of at least one other thread completing and releasing a portion of memory back to the system. The memory allocator may subsequently determine whether the new available memory combined with other available memory is enough to satisfy the request, at operation 610. If there is enough memory to satisfy the request, then the memory allocator may unblock the request, at operation 612, such that the thread may resubmit its memory request to the memory allocator. In some cases, upon determining that the thread still hold priority over other pending threads, the request may be satisfied, such that memory is allocated to the request, to enable the thread to perform its task.

Figure 7:
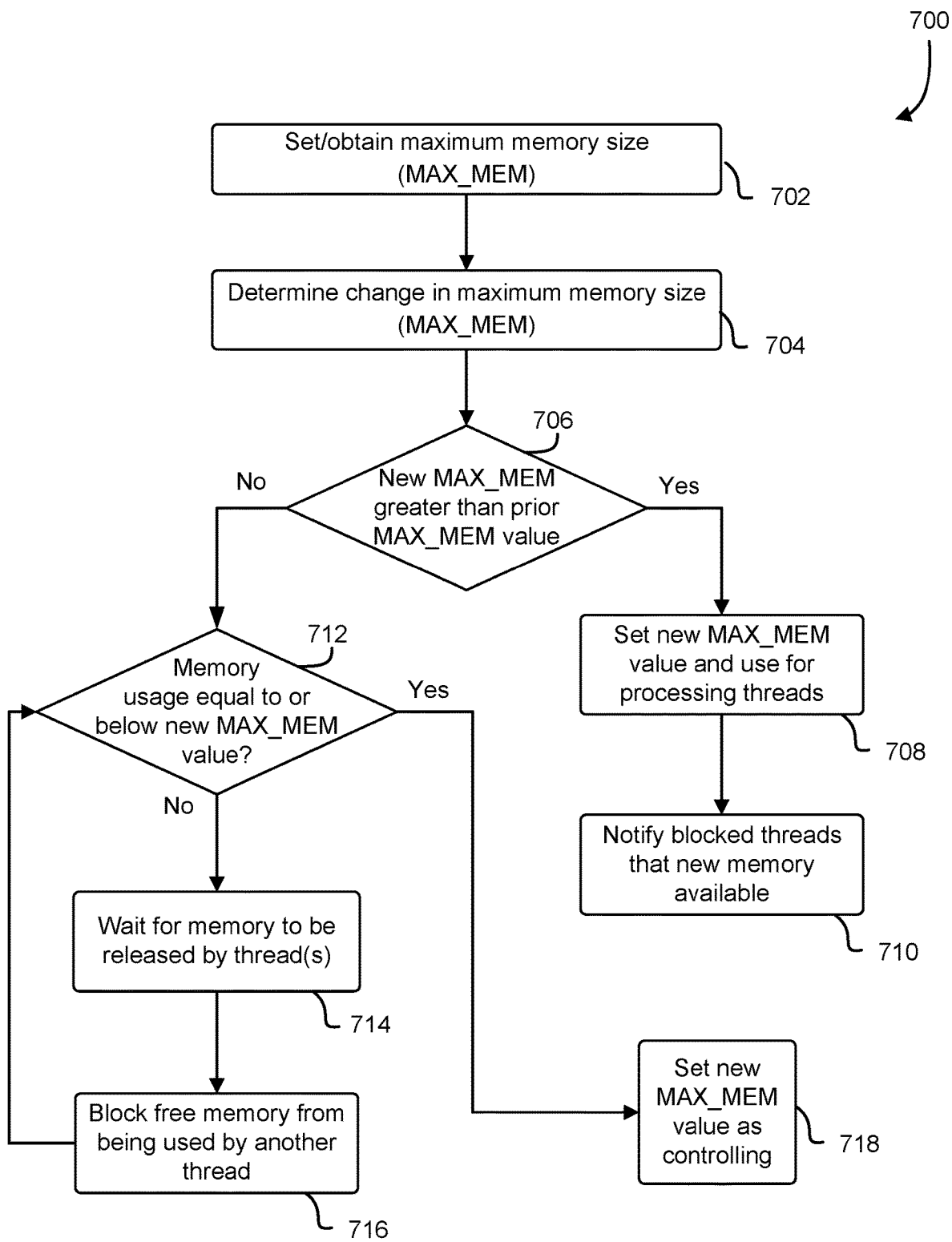
FIG. 7 illustrates another example process for dynamically allocating memory to a thread, according to at least one embodiment.

FIG. 7 illustrates another example process 700 for dynamically allocating memory to a thread. In some aspects, process 700 may be performed by one or more of a database service 110, a graph database service 204, a scaling service 106, 224, a VM 124, 224, or various components thereof, including a memory allocator 116, 216, database engine 114, 208, or ML system 210 described above in reference to FIGS. 1 and 2. In some cases, process 700 may utilize one or more communications between different of these various components and systems, such as including communications 300 and/or 400 described above in reference to FIGS. 3 and 4.

Process 700 may begin at operation 702, in which a MAX_MEM size may be set or determined, for example, by a memory allocator. The MAX_MEM value may be selected for the system as a whole, for a group of threads, a class of threads sharing some common characteristics, or for individual threads, at operation 702. A change in the MAX_MEM value may then be determined or detected, at operation 704. The change may be based on more or less memory being allocated to the system, one or more threads completing, and releasing previously used resources, etc. In some cases, operation 704 may be responsive to more memory being allocated to a virtual machine, such as a java virtual machine (JVM), with which the memory allocator is associated. As described in more detail above, the memory (e.g., MAX_MEM) of the JVM may be increased via initializing the JVM by reallocating native memory of the java virtual machine to act as heap memory, such that native memory available to the java virtual machine can be readily increased upon detecting an increase in the maximum managed memory size. In a similar way, the available memory (e.g., MAX_MEM) of the JVM may be decreased by releasing a portion of native memory of the java virtual machine, the portion of native memory acting in place of heap memory.

Next, at operation 706, the memory allocator may determine if the new MAX_MEM value is greater than or less than the prior MAX_MEM value. If the new MAX_MEM value is greater than the prior value, then the new MAX_MEM value may be set as the new controlling value for the memory allocator, at operation 708, and blocked threads may be notified of the increase in available resources, at operation 710. Operation 710 may then prompt one or more threads to resubmit request for memory, such as in an order determined by a priority policy. Operation 710 may trigger some or all of process 500 or process 600 to be performed, to allocate memory to one or more threads.

If, at operation 706, the new MAX_MEM value is determined to be less than the prior value, indicating a scaling down scenario, process 700 may proceed to operation 712. At operation 712, the memory allocator may determine if actual memory usage at that time (or a time proximate to process 700 or certain operations thereof being performed) is below the new MAX_MEM value. If it is, then the new MAX_MEM value may set/used as the new value by the memory allocator going forward. If, however, the actual memory usage is greater than the new MAX_MEM value, process 700 may proceed to operation 714, in which the memory allocator may wait until memory is released by one or more threads (or alternatively until more memory is allocated to the memory allocator), at operation 714. Upon more memory becoming available, free memory may be blocked from being used by other threads, and process 700 may continue to loop through operations 712-716, until memory usage is equal to or below the new MAX_MEM value, at which point the new MAX_MEM value be set as the controlling value, at operation 718.

Figure 8:
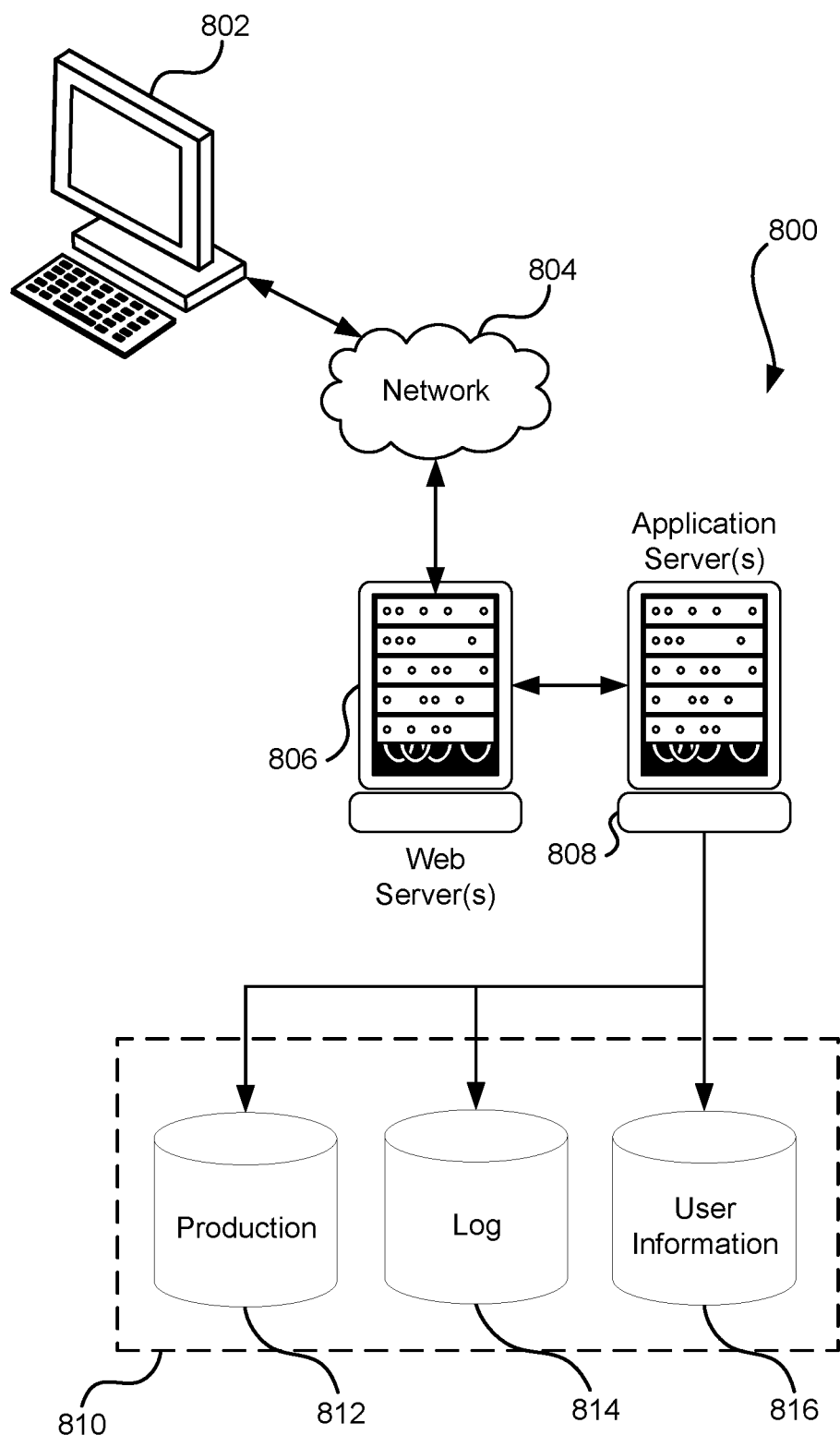
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network.

As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at 5 least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising: obtain, by a virtual computing system, a first thread from a thread pool, the first thread executing instructions that requests a first amount of memory to perform a first operation by a scalable graph database service;

determine that the first amount of memory to perform the first operation is greater than available memory of a maximum managed memory size of the virtual computing system, the maximum managed memory size being less than a total memory of the virtual computing system;

based on the determining, temporarily block the first thread and maintain the first thread in the pool of threads;

based on detecting an increase in the available memory of the virtual computing system caused by at least one of: an increase in the maximum managed memory size of the virtual computing system initiated by the scalable graph database service or completion of a second thread releasing a second amount of memory, select the first thread from the thread pool, the selecting based on a comparison of the increase in the available memory of the system and the first amount of memory; and process the first thread, to perform the first operation with respect to the scalable graph database service;

detect a decrease in the maximum managed memory size of the virtual computing system, the decrease in the maximum managed memory size initiated by the scalable graph database service; and responsive to detecting the decrease in the maximum managed memory size, and upon completion of execution of at least one third thread associated with a third portion of memory, reduce the available memory of the virtual computing system for processing additional threads of the pool of threads by the third portion of memory.

2. The computer-implemented method of claim 1, wherein temporarily blocking the first thread comprises associating a condition variable with the first thread, and wherein causing the system to process the first thread further comprises notifying the condition variable of the first thread of the change in available free memory.

3. The computer-implemented method of claim 1, wherein the virtual computing machine corresponds to a java virtual machine, and wherein increasing the maximum managed memory size of the virtual computing system further comprises:

initializing the java virtual machine by reallocating native memory of the java virtual machine to act as heap memory, such that native memory available to the java virtual machine is increased upon detecting an increase in the maximum managed memory size.

4. A system, comprising:
one or more processors;
memory that stores computer-executable instructions that, if executed, cause the one or more processors to:
obtain a thread from a pool of threads, the thread comprising a request to use a portion of memory of the system, the request associated with a query of a database;
determine that the portion of memory to satisfy the request is greater than available memory of a maximum managed memory size, the maximum managed memory size being less than a total memory of the system;
based on the determining, block the thread, by associating a condition variable with the thread, until additional memory becomes available;
determine, based at least in part on a change in the available memory of the system, that the available memory of the system is equal to or greater than the portion of memory to satisfy the request; and
based on the determining that the available memory of the system is sufficient to satisfy the request, cause the system to process the thread and provide a response to the query, wherein causing the system to process the thread further comprises notifying the condition variable of the thread of the change in available free memory.

5. The system of claim 4, wherein the memory stores additional computer-executable instructions that, if executed, further cause the one or more processors to:
notify, based on determining the change in the available free memory of the system, a second thread from the pool of threads that memory is available to process the second thread, based on a priority value associated with the second thread.

6. The system of claim 4, wherein the memory stores additional computer-executable instructions that, if executed, further cause the one or more processors to:
notify, based on a priority policy, a second thread from the pool of threads for processing, that memory is available to process the second thread by notifying a condition variable of the second thread.

7. The system of claim 4, wherein the memory stores additional computer-executable instructions that, if executed, further cause the one or more processors to:
detect an increase to the maximum managed memory size; and
responsive to detecting the increase to the maximum managed memory size, select a second thread for processing, the second thread selected using a priority policy.

8. The system of claim 4, wherein the memory stores additional computer-executable instructions that, if executed, further cause the one or more processors to:
detect a decrease to the maximum managed memory size; and
responsive to detecting the decrease to the maximum managed memory size, remove memory from the available free memory upon completion of execution at least one thread.

9. The system of claim 4, wherein the memory stores additional computer-executable instructions that, if executed, further cause the one or more processors to:
cause the maximum managed memory size to be modified based at least in part on determining that the portion of memory to satisfy the request is greater than available memory of the maximum managed memory size.

10. The system of claim 4, wherein the memory stores additional computer-executable instructions that, if executed, further cause the one or more processors to:
increase the maximum managed memory size based at least in part on determining that the portion of memory to satisfy the request is greater than available memory of the maximum managed memory size.

11. A non-transitory computer-readable storage medium storing thereon executable instructions that, as a result of being executed by one or more processors of a computer system, cause the computer system to at least:
receive a request from a collection of requests, the request comprising a request to use a portion of memory of the system, the request associated with a query of a graph database;

determine that the portion of memory to satisfy the request is greater than available memory of a maximum managed memory size, the maximum managed memory size being less than a total memory of the system;

based on the determining, block the request, by associating an indication with the thread, until additional memory becomes available;

detect an increase in the available memory of the computer system;

responsive to detecting an increased available memory of the computer system, notify at least one request of the collection of requests of the increased available memory by updating the indication associated with the request; and cause the computer system to satisfy the at least one request by providing a response to the query, wherein causing the system to satisfy the at least one request, is based on a determination that the increased available memory is equal to or greater than a portion of memory to satisfy the at least one request.

12. The non-transitory computer-readable storage medium of claim 11, wherein the instructions further comprise instructions that, as a result of being executed by the one or more processors, cause the computer system to:

select the at least one request to notify of the increased available memory based on a priority policy, wherein individual requests of the collection of requests are associated with a priority value.

13. The non-transitory computer-readable storage medium of claim 11, wherein the instructions further comprise instructions that, as a result of being executed by the one or more processors, cause the computer system to:

cause the maximum managed memory size to be modified based at least in part on determining that the portion of memory to satisfy the request is greater than available memory of the maximum managed memory size.

14. The non-transitory computer-readable storage medium of claim 11, wherein the instructions further comprise instructions that, as a result of being executed by the one or more processors, cause the computer system to:

detect a decrease to the maximum managed memory size; and responsive to detecting the decrease to the maximum managed memory size, remove memory from the available memory upon satisfaction of at least one request.

15. The non-transitory computer-readable storage medium of claim 11, wherein the instructions further comprise instructions that, as a result of being executed by the one or more processors, cause the computer system to:

detect an increase to the maximum managed memory size; and responsive to detecting the increase to the maximum managed memory size, cause a second request from the collection of requests to be satisfied.

16. The non-transitory computer-readable storage medium of claim 11, wherein the maximum memory size comprises a plurality maximum memory sizes associated with different requests of the collection of requests.

17. The non-transitory computer-readable storage medium of claim 11, wherein the computer system includes a java virtual machine, wherein the instructions further comprise instructions that, as a result of being executed by the one or more processors, cause the computer system to:

increase the maximum managed memory size by reallocating native memory of the java virtual machine to act as heap memory, such that native memory available to the java virtual machine is increased upon detecting an increase in the maximum managed memory size.

18. The non-transitory computer-readable storage medium of claim 11, wherein the computer system includes a java virtual machine, wherein the instructions further comprise instructions that, as a result of being executed by the one or more processors, cause the computer system to:

decrease the maximum managed memory size of the java virtual machine by releasing a portion of native memory of the java virtual machine, the portion of native memory acting in place of heap memory.

* * * * *